Jan. 2, 1962  M. F. MARX  3,015,458
STALL AND HIGH SPEED BUFFETING LIMITER FOR AIRCRAFT
Filed Oct. 1, 1956

Inventor:
Michael F. Marx,
by Roe D. McBurnett
His Attorney.

United States Patent Office 3,015,458
Patented Jan. 2, 1962

3,015,458
STALL AND HIGH SPEED BUFFETING LIMITER FOR AIRCRAFT
Michael F. Marx, Schenectady, N.Y., assignor to General Electric Company, a corporation of New York
Filed Oct. 1, 1956, Ser. No. 612,999
2 Claims. (Cl. 244—77)

This invention relates to a stall and high speed buffeting limiter for aircraft and more particularly to a stall and high speed buffeting limiter which limits either the manual command signal provided by a human pilot or the command signal provided by an automatic pilot, depending on the mode of operation of the aircraft.

As is well known to all persons familiar with aircraft, all types of aircraft have a critical elevator deflection relative to speed above which the aircraft will go into a stall condition. A stall is a condition under which the air seperates from the upper wing surface resulting either in loss of lift or dangerous buffeting. If an aircraft were in level flight at a relatively slow speed and the elevators were suddenly deflected upwardly, the nose of the aircraft would tend to rise. As the nose of the aircraft rises and exceeds the stall angle of attack, the lifting forces on the aircraft decrease due to separation of the air from the upper wing. If the elevator deflection were greater than the critical deflection for the particular flight condition, the lifting forces would not be sufficient to maintain the aircraft in flight and a stall condition would result. During a stall an aircraft can fall off into a spin and in some circumstances it is impossible for the human pilot to recover from such spin before the aircraft crashes into the ground. Under some flight conditions, it is impossible for the human pilot to determine the critical elevator deflection until it has been exceeded and the aircraft has stalled, thus greatly endangering the human pilot's life. Therefore, there is a great need for a limiter associated with aircraft control systems which will prevent the human pilot from exceeding the critical elevator deflection and thereby placing the aircraft into a stalled condition.

When flying with the automatic pilot of the aircraft engaged, it is very possible that the automatic pilot will provide a signal to the elevators of such aircraft requiring a deflection of the elevators sufficient to place the aircraft into a stall condition. Obviously, the human pilot would have no control over such signal generated by the automatic pilot. Therefore, there is a great need for a limiter in flight control systems which will prevent signals from the automatic pilot of sufficient strength to cause an unsafe elevator deflection such that the aircraft would be placed into a stalled condition.

In modern day aircraft which are capable of transonic speeds a new condition has developed. This condition is termed high speed buffeting and its presence in aircraft is a function of the Mach number at which the aircraft is flying. During high speed buffeting, local separation occurs in a manner similar to that described for low speed flight. Hence the condition is often referred to as "high speed stall." The local stalling of lifting surfaces in this instance takes place at high dynamic pressure and thus at high energy conditions. Consequently the resulting buffeting can quite easily exceed the structural limits of the airplane. The danger to human life from such bueffeting is obvious. A high speed buffeting condition could readily occur under either manual or automatic control of an aircraft by providing too great a deflection of the elevator control surface of the aircraft for its flight condition. Therefore, there is a great need on modern day aircraft for a limiter which under any flight condition will prevent an elevator deflection of such magnitude that the aircraft would be subject to high speed buffeting.

Therefore, it is the principal object of this invention to provide a limiter which will prevent the human pilot from deflecting the elevator control surface of an aircraft to such an extent that the aircraft would be subject either to a low speed stall condition or high speed buffeting.

A further object of this invention is to provide a new and improved limiter which will prevent the automatic pilot of a flight control system from deflecting the elevator control surface sufficiently to cause either a low speed stall condition or high speed buffeting.

A still further object of this invention is to provide a new and improved limiter in conjunction with the flight control system of an aircraft which includes means to prevent the human pilot from causing unsafe elevator deflections and means to prevent the automatic pilot from causing unsafe elevator deflections such that the aircraft would be placed in a low speed stall condition or be subject to high speed buffeting.

In carrying out this invention in one form, means associated with the manual control of an aircraft are provided to impress a control or command signal on a servo which actuates the elevator control surface of such aircraft. Alternatively, a control or command signal is impressed on the servo when the automatic pilot of such aircraft is engaged. Limiter means are provided in the flight control system such that the command signal from either the manual control or the automatic pilot is reduced to a predetermined safe value for the aircraft flight condition, if such signal is of sufficient strength to deflect the elevators so as to cause either a low speed stall condition or a high speed buffeting condition.

This invention will be better understood from the following description taken in connection with the accompanying drawings wherein.

Figure 1:
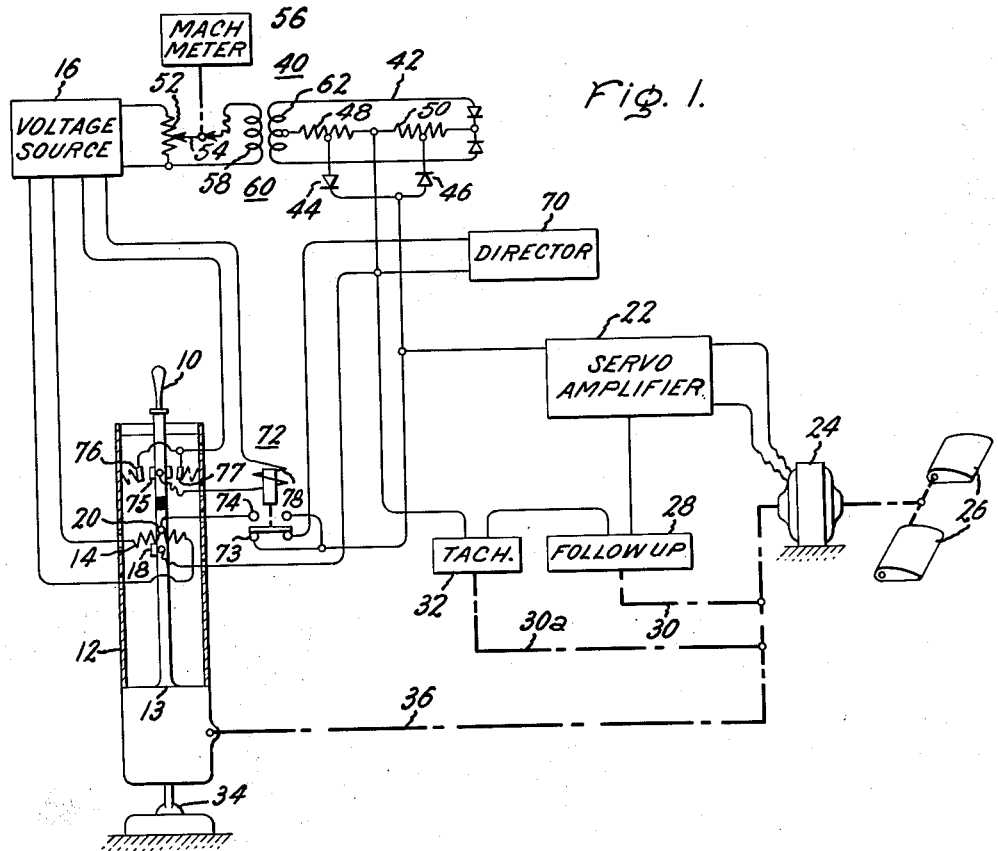
FIGURE 1 is a schematic diagram embodying one form of the invention used to limit the elevator deflection of an aircraft.

In the preferred embodiment the invention is described as used with an electrical flight control system. However, it is to be distinctly understood that the invention is not limited to an electrical control system. Obviously, the invention would function equally well in other types of control systems. For example, the present invention would be readily applied to the hydraulic-electric control system shown and described in the copending application of James M. Cooper and Richard E. Bartholomew for "Control Apparatus," Serial No. 465,172, filed October 28, 1954, and assigned to the same assignee as the present invention.

Referring to the drawing wherein like numerals are used to indicate like parts throughout, the invention in one form comprises manual control means for controlling an aircraft, a preferred embodiment being shown as a control stick 10 attached to a control column 12. Movement of the control stick 10 actuates a means for developing a control signal proportional to such movement. As shown in the preferred embodiment, the control stick 10 is connected to operate a force sensor which is shown in the form of a potentiometer 14 connected across a voltage source 16. The arm of slider 18 of potentiometer 14 is attached to control stick 10 so that movement of the stick 10 will move the slider 18 in one direction or another from center tap 20 to develop a control or command signal which varies in polarity and magnitude according to the movement of the stick 10. Means are provided for energizing a servo motor 24 by the control signal. In the preferred embodiment, the signal from the force sensor, which is taken between arm 18 and center tap 20, operates a servo amplifier 22 which in turn energizes a servo motor 24. The servo motor 24 is mechanically connected to elevators 26 through appropriate gearing (not shown). Elevators 26 are moved to the proper position by the turning of the servo motor 24 in response to the command signal developed between arm 18 and center tap 20 of the force sensor. To insure the proper positioning of elevators 26, a follow-up or feedback 28 is provided. The follow-up 28 is actuated by a shaft 30 which is connected to servo motor 24 so that it generates or develops a signal in opposition to the signal fed to amplifier 22 and proportional to the displacement of elevators 26. A tachometer 32 is also provided to prevent hunting of elevators 26 in a manner well known in the art. The tachometer 32 is connected to servo motor 24 by a shaft 30a and generates a signal proportional to the rate of movement of the elevators 26. The manual control system above described is similar to that described in a co-pending application of the present inventor and entitled "Maneuver Limiter for Aircraft," Serial No. 607,310, filed August 31, 1956, now U.S. Patent No. 2,983,469, and assigned to the same assignee as the present invention. As more fully described in said co-pending application, the manual control system provides a proportionate feel system for the human pilot due to the bending of control stick 10, which is attached to control column 12 as at 13. The control column 12 is movably secured to the aircraft (not shown) by means of a universal joint 34. The control column 12 is also operatively connected to the servo motor 24, for example, as by means of a mechanical linkage indicated by the dotted line 36. This connection is fully described and claimed in the aforementioned co-pending application, Serial No. 607,310, and forms no part of the present invention.

Included in the flight control system is a limiter means to limit the strength of the control signal. The limiter means, generally designated as 40, is shown, by way of example, as a limiter 42 which comprises a pair of oppositely poled unidirectional conducting devices, such as rectifiers 44 and 46 which are connected across the input of servo amplifier 22. Of course, it is understood that any types of unidirectional conducting devices could be used, for example diodes and the like. A bias voltage is placed upon the rectifiers 44 and 46 by resistors 48 and 50 respectively such that the rectifiers 44 and 46 are non-conducting to any signal of less strength than the bias voltage. The bias voltage on resistors 48 and 50 is provided by the voltage drop across a potentiometer 52 which is connected across the voltage source 16. The bias voltage is varied by means of a slider or arm 54 which is moved across potentiometer 52 by the action of a Mach meter or computer 56. The relation is such that as the aircraft increases its speed the Mach meter 56 moves the slider 54 so as to pick off a smaller bias voltage from potentiometer 52. The voltage taken from potentiometer 52 excites the primary winding 58 of transformer 60 thereby inducing a voltage in the secondary winding 62. The voltage induced in the secondary winding 62 provides the bias on biasing resistors 48 and 50. A limiter similar to that described in the preferred embodiment of this invention is disclosed in the co-pending application of James M. Cooper for "Signal Voltage Amplitude Limiter and Phase Discriminator," Serial No. 282,497, filed April 15, 1952 now U.S. Patent No. 2,802,-167 and assigned to the same assignee as the present invention.

The Mach meter or computer is a well-known item of flight instrumentation. Briefly, the inputs to the Mach computer are static pressure and impact pressure, designated as $P_s$ and $Q_c$. From these inputs the Mach number is computed by the Mach computer from the equation $$M = \sqrt{\frac{2}{K-1}} \sqrt{\left(\frac{Q_c}{P_s}+1\right)^{\frac{K-1}{K}}-1}$$

The output of the Mach meter may be in the form of a shaft rotation, which is utilized to actuate the slider arm 54 of potentiometer 52.

Figure 2:
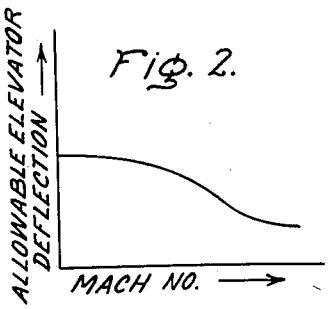
FIGURE 2 is a typical graph showing the allowable elevator deflection for an aircraft as a function of the Mach number at which the aircraft is flying.

The potentiometer 52 must be specially wound for each type of aircraft. FIGURE 2 is a typical example of the variation of allowable elevator deflection with increasing Mach number. This curve is determined for each type of aircraft and is then used as the schedule for winding the potentiometer 52 to be used with that type of aircraft. The allowable elevator deflection is the maximum elevator deflection which will not place the aircraft in a low-speed stall condition or subject it to high speed buffeting.

As an example of the operation of the present invention, consider that the human pilot desires to place the aircraft in a climbing attitude. The pilot would pull back on control stick 10, thus developing a signal between slider 18 and center tap 20 of the force sensor. This signal is fed to the servo amplifier 22 thereby causing the servo amplifier 22 to energize servo motor 24. Servo motor 24 turns in such a direction as to cause elevators 26 to deflect upwardly, placing the aircraft in a climbing attitude. As the servo motor 24 rotates to deflect the elevators 26, follow-up 28 is actuated by shaft 30 so as to generate a signal in opposition to the signal from the force sensor and proportional to the displacement of elevators 26. At the same time, tachometer 32 is operated through shaft 30a to generate a signal proportional to the rate of the movement of elevators 26, also in opposition to the signal from the force sensor. As elevators 26 approach the desired position, the signal from follow-up 28 becomes almost equal to the signal from the force sensor and the signal from the tachometer 32 aproaches zero. When the elevators 26 have reached the desired position, the signal from follow-up 28 is exactly equal to the signal from the force sensor and the signal from tachometer 32 is zero. Should the signal developed by the force sensor between arm 18 and center tap 20 be of sufficient magnitude to cause an elevator deflection that would place the aircraft into a low speed stall condition or subject it to high speed buffeting, the limiter 40 would drain off so much of the command signal as was greater than the bias on the biasing resistors 48 and 50. A signal from the force sensor greater than the bias on rectifiers 44 or 46 would be sufficient to cause one of the rectifiers 44 or 46 to begin conducting, therefore limiting the signal to the bias voltage. The polarity of the command signal would determine which rectifier would conduct.

The above described limiter 40 also functions with an automatic pilot to prevent the automatic pilot means from providing a signal to the elevator control surfaces that would place the aircraft in a stalled condition or subject it to high speed buffeting. When used with an automatic pilot, an automatic control or director means is provided which generates a signal proportional to a deviation of the aircraft. As shown in the preferred embodiment, the director 70, for example a pitch rate gyro, is connected to the servo amplifier 22. The signal generated by director means 70 is fed to servo amplifier 22 causing the amplifier 22 to energize servo motor 24 thereby deflecting elevators 26. The limiter 40 operates to limit a signal from director 70 in the same way that it limits a command signal from the manual control system.

The automatic pilot or director 70 is prevented from sending a signal into the control channel while the human pilot is on manual control in the same manner as set forth in applicant's co-pending application, Serial No. 607,310, as hereinbefore set forth. Briefly, a switch 72 is provided having two pairs of contacts 73 and 74. In normal hands off flight, contacts 73 of switch 72 are closed and the automatic pilot is engaged. However, when the human pilot moves the control stick 10 in either direction within the control column 12, contact 75 on control stick 10 engages either contact 76 or 77 which are spring mounted on control column 12. When contact 75 engages either of contacts 76 or 77, solenoid 78 is energized through the voltage source 16. The energization of solenoid 78 operates the switch 72 to open contacts 73 and close contacts 74. This automatic switching removes the automatic pilot from the control channel and places the force sensor in the control channel by connecting center tap 20 and slider 18 of potentiometer 14 to the servo amplifier 22.

By use of this invention the human pilot is unable to develop a signal between slider 18 and center tap 20 of sufficient strength to deflect elevators 26 so as to cause the aircraft to stall or to be subjected to high speed buffeting since the limiter 40 would limit the strengh of such signal to that of this bias voltage across eiher resistors 48 or 50. The invention functions in the same manner to limit a command signal from the automatic pilot thereby preventing the aircraft from being stalled or being subjected to high speed buffeting under any flight conditions.

Various modifications of the preferred embodiment will appear obvious to those skilled in the art. The various components shown and described are by way of example only since it is obvious that many substitutions may be made without departing from the spirit and scope of the invention as defined in the appended claims.

What is claimed as new and which is desired to secure by Letters Patent is:

1. In a flight control system for an aircraft having a movable elevator control surface, a control stick adapted to develop a control signal for manual control of said aircraft, a director means for developing a control signal for automatic control of said aircraft, a servo adapted to actuate said elevator control surface, means for energizing said servo by one of said control signals, said means including switching means adapted to provide manual or automatic control of said aircraft, and limiter means adapted to limit the strength of said one control signal, said limiter means including unidirectional devices provided with a variable bias voltage varied in response to the speed of said aircraft whereby sad control signal controlling said aircraft is limited to a predetermined safe value determined by the speed of said aircraft.

2. In an aircraft having a movable elevator control surface, a control member adapted to develop a control signal for manual control of said aircraft, director means for developing a control signal for automatic control of said aircraft, a servo adapted to actuate said elevator control surface, means for energizing said servo by one of said control signals and limiter means adpted to limit the strength of said one control signal, said limiter means including an aircraft speed responsive device, a potentiometer variable in response to said speed responsive device, oppositely poled unidirectional devices, biasing resistors for said unidirectional devices, circuit means connecting said potentiometer to said biasing resistors to provide the bias thereon, circuit means connecting said unidirectional devices across said servo, whereby said control signal is drained off through said unidirectional devices when said control signal is greater than said bias on said biasing resistors.

References Cited in the file of this patent
UNITED STATES PATENTS

| | | |
|---|---|---|
| 2,663,001 | Rusler et al. | Dec. 15, 1953 |
| 2,705,116 | Yates et al. | Mar. 29, 1955 |
| 2,751,542 | Woodward | June 19, 1956 |
| 2,751,543 | Alderson | June 19, 1956 |
| 2,770,429 | Schuck et al. | Nov. 13, 1956 |
| 2,801,059 | Hecht et al. | July 30, 1957 |
| 2,808,999 | Chenery | Oct. 8, 1957 |
| 2,842,731 | Owen | July 8, 1958 |
| 2,863,622 | Ciscel | Dec. 9, 1958 |
| 2,936,134 | Miller et al. | May 10, 1960 |